United States Patent [19]

Hirsch

[11] 4,171,845

[45] Oct. 23, 1979

[54] WINDOW SHADE APPARATUS FOR A VEHICLE

[76] Inventor: Bertram H. Hirsch, 56 Montclair Ave., Daly City, San Mateo, Calif. 94015

[21] Appl. No.: 896,815

[22] Filed: Apr. 17, 1978

[51] Int. Cl.² .............................................. B60J 3/00
[52] U.S. Cl. .................................. 296/97 C; 160/310; 135/DIG. 10
[58] Field of Search ............... 160/310; 135/DIG. 10; 296/97 C

[56] References Cited

U.S. PATENT DOCUMENTS

| | | | |
|---|---|---|---|
| 1,857,682 | 5/1932 | Baraguanath | 160/310 |
| 3,847,171 | 11/1974 | Akers | 160/310 |
| 4,059,339 | 11/1977 | Brown | 160/310 |
| 4,062,371 | 12/1977 | Bolen | 135/DIG. 10 |

*Primary Examiner*—Philip Goodman
*Attorney, Agent, or Firm*—Phillips, Moore, Weissenberger, Lempio & Majestic

[57] ABSTRACT

A window shade apparatus for an automobile or the like may be fitted to a sun visor thereof, and in one embodiment the shade thereof may be raised and lowered through releasing of a brake system acting on the roller thereof. In another embodiment, an electrical switch may be actuated to drive a reversible electric motor in one and the other direction to raise and lower the shade of the apparatus.

6 Claims, 10 Drawing Figures

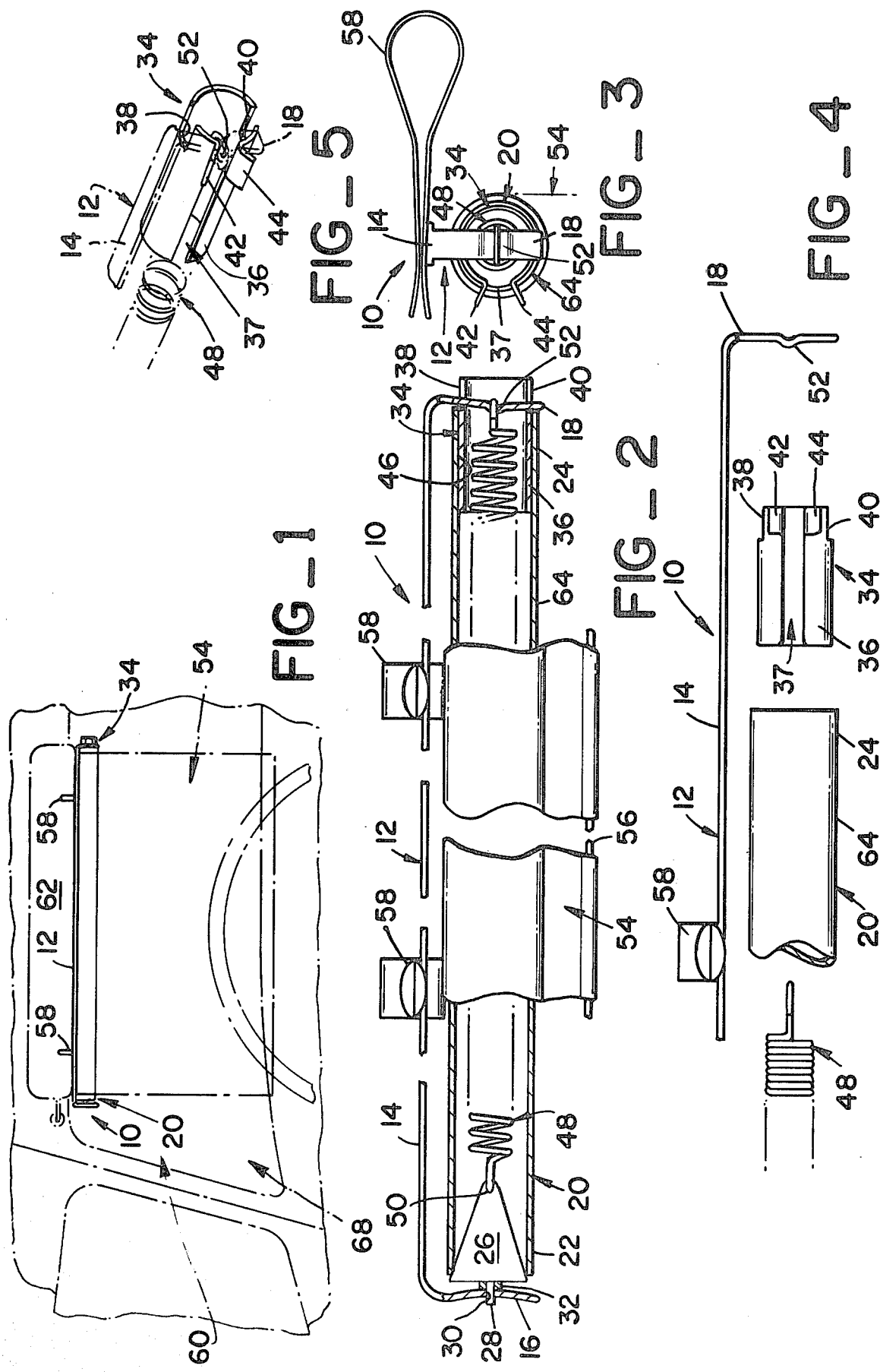

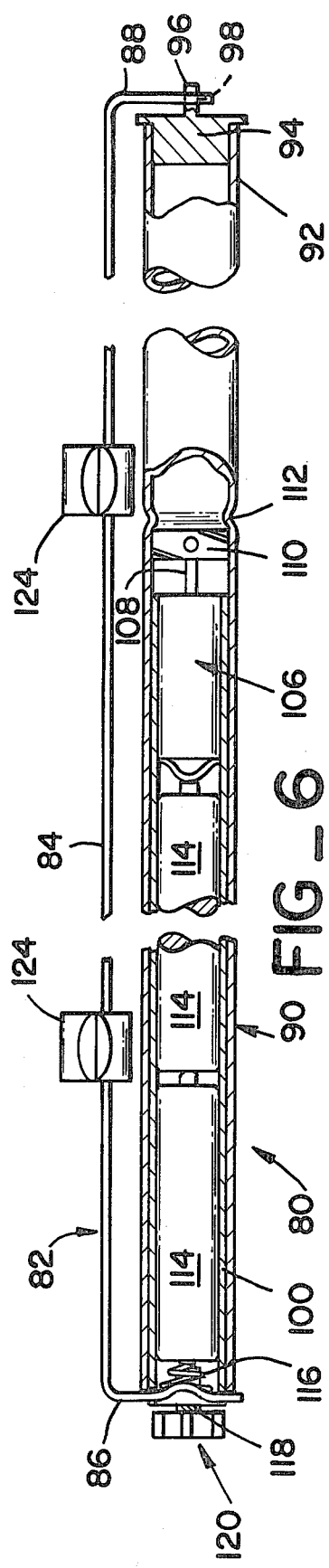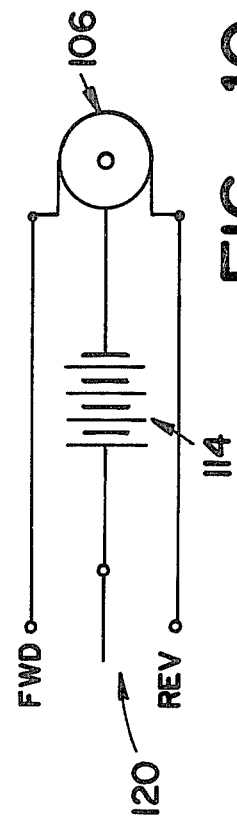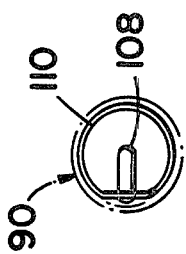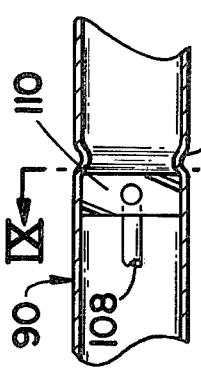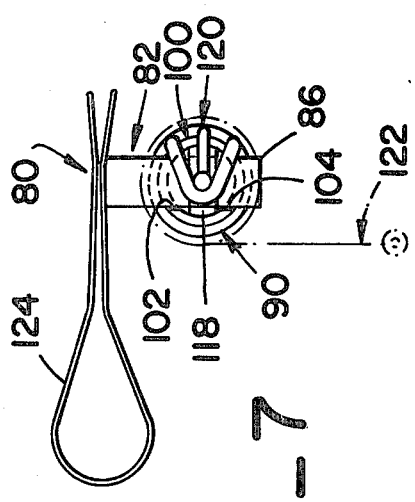

WINDOW SHADE APPARATUS FOR A VEHICLE

BACKGROUND OF THE INVENTION

This invention relates to shade apparatus, and more particularly, to a window shade apparatus which can be fitted to a vehicle.

When a vehicle is parked in the sunlight on a warm day, a great amount of sunlight enters the vehicle through the windshield. This has the effect of greatly raising the interior temperature of the automobile, to the point where the operator of the vehicle upon entering the car experiences a certain degree of discomfort. It will be understood that this discomfort will last for a relatively long period of time until air has had a chance to circulate through the car and cool down the heated area of the car. If the car is equipped with air conditioning, which is actuated upon automobile startup, it will be understood that the air conditioning system must be actuated for a relatively long period of time to cool the vehicle interior to the desired point, resulting in use of more vehicle fuel than would be necessary if the interior could be kept at a lower temperature while the vehicle is resting in the sun.

SUMMARY OF THE INVENTION

It is accordingly an object of this invention to provide shade apparatus for a vehicle which can be mounted behind or inside the windshield of the vehicle for the purpose of preventing heat buildup within the parked vehicle.

It is a further object of this invention to provide shade apparatus which is conveniently useable and efficiently designed.

It is still a further object of this invention to provide shade apparatus which, while fulfilling the above objects, can be easily fitted to a vehicle or removed therefrom.

Broadly stated, the invention comprises a shade apparatus for a vehicle window comprising a frame, a roller rotatably mounted to the frame, and a shade secured to the roller. Means are included whereby the roller may be rotated so that the shade can be raised and lowered as chosen.

BRIEF DESCRIPTION OF THE DRAWINGS

These and other objects of the invention will become apparent from a study of the following specification and drawings, in which:

FIG. 1 is an overall view of a first embodiment of apparatus shown as fitted to the sun visor of a vehicle;

FIG. 2 is a side view of the apparatus of FIG. 1, partially in section;

FIG. 3 is an end view of the apparatus shown in FIG. 2;

FIG. 4 is an exploded view of a portion of the apparatus shown in FIG. 2;

FIG. 5 is a perspective view of a portion of the apparatus shown in FIG. 2;

FIG. 6 is a view similar to that shown in FIG. 2, but of a second embodiment of the invention;

FIG. 7 is an end view of the apparatus shown in FIG. 6;

FIG. 8 is an enlarged view of a portion of the apparatus shown in FIG. 6;

FIG. 9 is a view taken along the line IX—IX of FIG. 8; and

FIG. 10 is a schematic view of the electrical circuitry of the apparatus of FIGS. 6-9.

DESCRIPTION OF THE PREFERRED EMBODIMENT

Shown in FIGS. 1-5 is a first embodiment of shade apparatus 10. As shown therein, such apparatus 10 includes a frame 12 having an elongated main portion 14, and first and second opposite end portions 16, 18 which are generally perpendicular to the main portion 14. The frame 12 is fabricated of resilient metal. A roller 20 is operatively associated with the frame 12, and is positioned so that the end portions 16, 18 are at opposite ends 22, 24 of the roller 20. The roller 20 is tubular throughout its length, and has wedged in one end 22 thereof a triangular-shaped end member 26. The end member 26 defines a short axle 28 positioned outwardly of the end 22 of the roller 20, and such axle 24 is disposed in a bore 30 defined by the end portion 16. A washer 32 is disposed between the end portion 16 and end member 26.

A brake apparatus resilient spring member 34 is shown in detail in FIG. 5. As shown therein, and also in FIGS. 2-4, the brake apparatus spring member 34 includes a body 36 of tubular shape which defines a gap 37 along its length and indentations 38, 40 at one end thereof. Extensions 42, 44 extend from the tubular part 36 of the member 34, on one and the other sides of the gap 37. The body 36 extends into the tubular roller 20 at one end 24 thereof, and is expandable under its own resilience to grip the inner surface 46 of the tubular roller 20. Squeezing of the extensions 42, 44 upon application of force thereto to move them together allows relative rotation between the roller 20 and spring member 34, due to contraction of the spring member 34.

An elongated resilient helical spring 48 has one end disposed in an aperture 50 defined by the end member 26, with the other end looped over an indented portion 52 of the end portion 18 of the frame 12. The end portion 18 of the frame 12 seats in the indentations 38, 40 of the brake apparatus spring member 34, so that the brake apparatus spring member 34 is secured in position relative to the frame 12. The indented portion 52 of the end portion 18 insures that the helical spring 48 stays in place as shown in FIG. 2, and meanwhile the indented portion 52, extending into the tubular roller 20, acts as an axle for the roller 20.

A shade member 54 in the form of a thin flexible sheet is secured to the roller 20, and the spring 48 is pre-wound into a state to provide biasing of the roller 20, such that the roller 20 is urged in a direction rolling the shade 54 on the roller 20. The extending end of the shade 54 has attached thereto along its length a rod 56 acting as a weight thereon.

A pair of spring clips 58 are secured to the elongated portion 14 of the frame 12 so that the frame 12 and apparatus 10 may be selectively secured to the sun visor 62 of a vehicle 60 as shown in FIG. 1.

With the parts so positioned, it is to be noted that the extensions 42, 44 extend beyond the outer surface 64 of the roller 20, so that they can be easily and conveniently reached.

With the apparatus 10 positioned as shown in FIG. 1, adjacent the windshield 66 of the vehicle 68, and assuming that the shade 54 is in its fully rolled state, the shade 54 may be extended downward by a person applying force to the extensions 42, 44 to move them together to contract the brake apparatus spring member 34 within the tubular roller 20. The shade 54 may then be pulled downward against the resilience of the helical spring 48, the roller 20 of course rotating during such action, until the lower edge of the shade 54 is in position on the dashboard 70 of the vehicle 68 as desired. The extensions 42, 44 are then released, whereby the extensions 42, 44 move apart, allowing the brake apparatus spring member 34 to expand and grip the inner surface 46 of the tubular roller 20, to thereby hold the roller 20 in position relative to the frame 12.

The brake apparatus spring member 34 is with advantage positioned adjacent that portion of the visor 62 which is generally unsupported, so that the person applying force to the extensions 42, 44 aids also in the support of that free end of the visor 62 during raising and lowering of the shade 54.

It will readily be seen that raising of the shade 54 is accomplished in a manner similar to that described above.

Shown in FIGS. 6–10 is another embodiment 80 of the invention. As shown therein, such embodiment 80 also includes a frame 82 having an elongated portion 84 and opposite end portions 86, 88. A tubular roller 90 has one end 92 thereof fitted with an end plug 94 defining an axle 96 which is disposed in an aperture 98 in the end portion 88. A tubular member 100 defines channels 102, 104 in which are positioned the opposite end portion 86 of the frame 82. The roller 90 is rotatably mounted on the tubular member 100, with the tubular member 100 extending therewithin.

Secured to the tubular member 100 therewithin at its inner end is a reversible electric motor 106. The output shaft 108 of the electric motor 106 extends further inward of the roller 90, and has affixed thereto a drive member 110 which is in gripping engagement with the inner surface of the roller 90 adjacent a crimped portion 112 of the roller 90. Batteries 114 are disposed within the tubular member 100, and a helical spring 116 is disposed between the end battery 114 and the end portion 86 of the frame 82.

The tubular member 100 has affixed thereto a mounting plate 118 to which in turn is fixed an electrical switch 120. The switch 120 is thus secured to the tubular member 100 and is positioned adjacent end portion 86 of frame 82. The electrical switch 120 is self-centering by means of a spring to normally adopt the position shown in FIG. 7. However, the switch 120 may be moved in one and the other directions to drive the reversible electric motor 106 in one and the other directions through the circuitry shown in FIG. 10.

It will be seen that rotation of the motor 106 in one and the other directions rotates the roller 90 in one and the other opposite directions as chosen, to in turn raise and lower a shade 122 attached to the roller 90, similar to the shade of the previous embodiment. The present apparatus 80 may be secured to the sun visor of a vehicle by spring clips 124 fixed to the elongated portion 84 of the frame 82, similar to the spring clips of the previous embodiment.

It will readily be seen that either embodiment of the invention can be easily and conveniently used, in particular being positionable to selectively block sunlight through the windshield of the car as the car is at rest. Furthermore, in either embodiment, the shade may be easily and conveniently raised or lowered in accordance with the previous discussion, whereby such shade may be positioned to be completely out of the way to allow the operator of the vehicle to proceed with driving the vehicle in a normal manner.

What is claimed is:

1. A self-contained shade apparatus for use with a vehicle window comprising:
    a frame;
    a roller rotatably mounted to the frame, said roller including a tubular portion, and further comprising a tubular member secured in position relative to the frame and extending within the tubular portion of said roller;
    a shade secured to the roller;
    an electric motor operatively associated with the roller for rotating the roller upon supply of electrical power thereto, said electric motor being disposed within the tubular member;
    a battery for supplying electric power to the motor disposed within the tubular member; and
    electrical switch means operatively connected with the motor and battery means for providing actuation and deactuation of the motor.

2. The apparatus of claim 1 and wherein said switch means are positioned adjacent an end of the frame and secured to the tubular member.

3. The apparatus of claim 2 wherein the motor is a reversible motor.

4. The invention of claim 1 wherein said switch means include a bi-directional switch operatively associated with a spring means, said spring means operating to center the switch from either of two directions.

5. The invention of claim 1 further including means for securing said shade apparatus to a vehicle.

6. The invention of claim 5 wherein said means for securing comprises a plurality of spring clips secured to said frame so that the apparatus may be mounted on a vehicle sun visor.

* * * * *